June 18, 1963 — O. A. KERSHNER — 3,094,194
FRICTION DEVICE
Filed Jan. 23, 1961 — 2 Sheets-Sheet 1

INVENTOR.
Osborn A. Kershner
BY
Olson & Trexler
attys

June 18, 1963  O. A. KERSHNER  3,094,194
FRICTION DEVICE
Filed Jan. 23, 1961  2 Sheets-Sheet 2
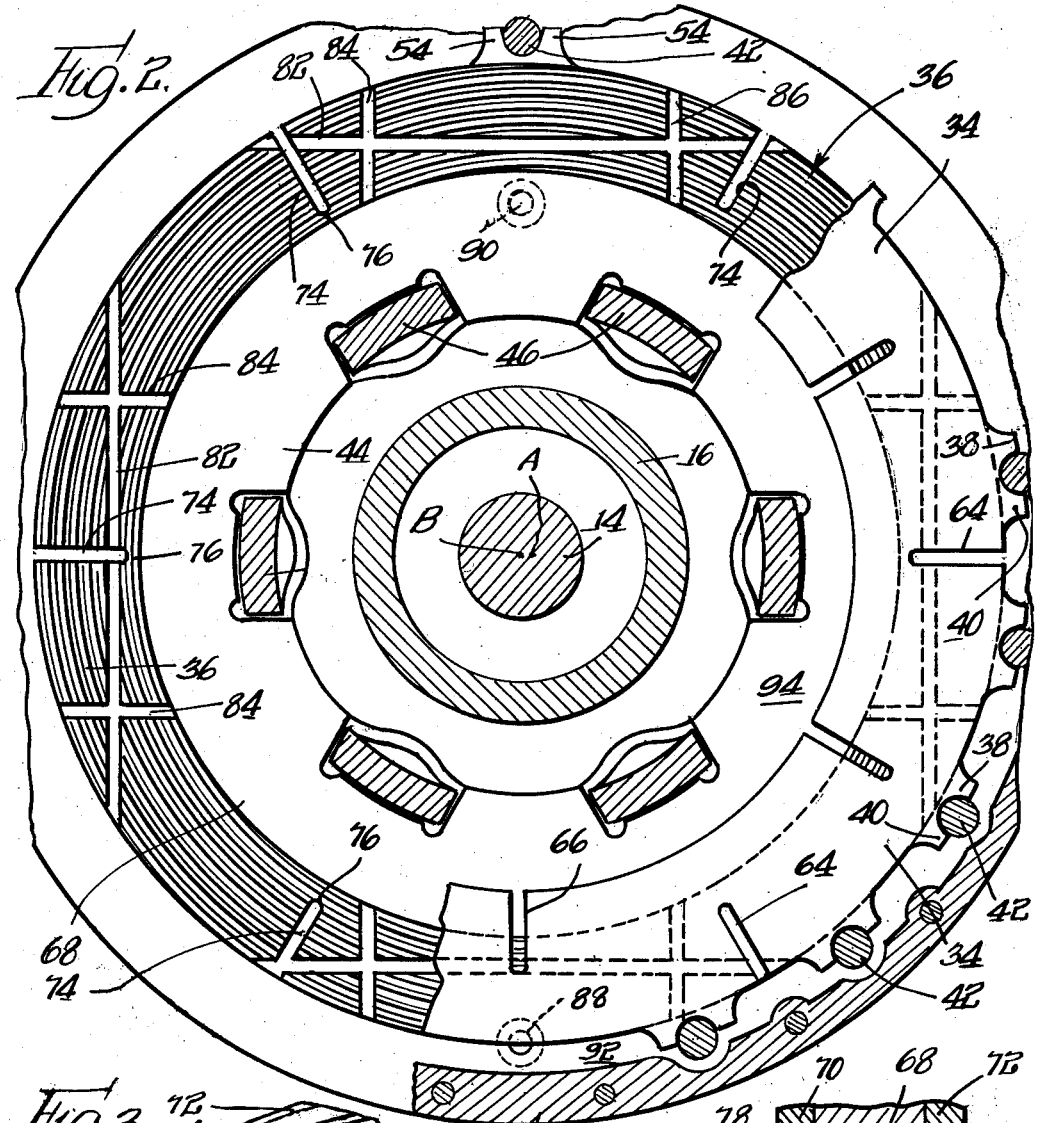
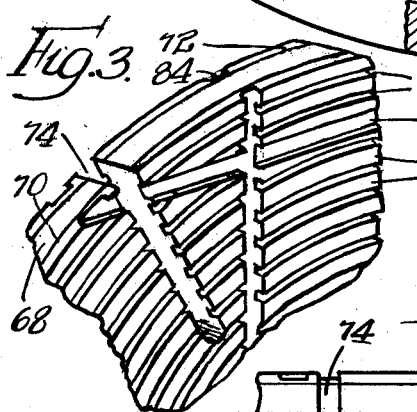
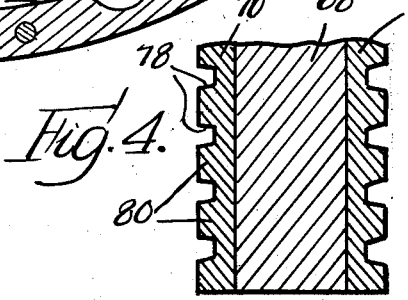
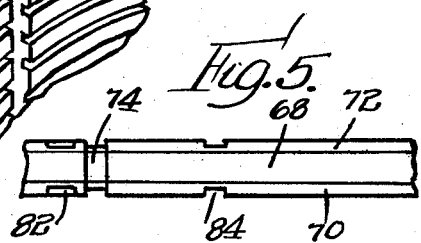
INVENTOR.
Osborn A. Kershner

3,094,194
FRICTION DEVICE
Osborn A. Kershner, St. Joseph, Mich., assignor, by mesne assignments, to Lambert Brake Corporation, St. Joseph, Mich., a corporation of Michigan
Filed Jan. 23, 1961, Ser. No. 84,131
3 Claims. (Cl. 188—72)

The present invention relates to friction devices, and more particularly to liquid cooled disc type friction devices or brakes.

Multiple disc friction devices or brakes of the type contemplated herein are suitable for use in many installations and are particularly adapted for heavy duty service. For example, such brakes may be installed in various earth working equipment, tractors, trailers, trucks, buses and other vehicles. Furthermore, friction devices or brakes of the type contemplated herein may be utilized in various installations of heavy industrial machinery.

Friction devices or brake structures of the general type contemplated herein have heretofore been proposed and include one or more discs fixed against rotation and one or more discs connected with a rotatable member to be controlled, and means for forcing the discs together when the brake structure is energized. One important problem encountered is the dissipation of heat which is generated when the discs are brought into frictional engagement with each other and efforts have been made to solve this problem by circulating liquid through the brake structure. However, in certain heretofore proposed structures difficulties have been encountered in circulating the liquid in a manner which obtains proper cooling and promotes a more efficient braking action.

An important object of the present invention is to provide a novel multiple disc friction device or brake structure which is constructed for enabling cooling liquid to flow therethrough in a manner which promotes a more effective and uniform cooling and a more efficient braking action.

A further object of the present invention is to provide a novel multiple disc liquid cooled friction device or brake structure which is constructed so as to promote distribution of cooling liquid through and between disc elements of the brake structure in a manner which substantially eliminates the creation of hot spots in the brake structure and the loss of efficiency which results from such hot spots.

Still another important object of the present invention is to provide a novel friction device or brake structure of the above described type which incorporates a novel friction disc construction for promoting improved results in minimizing wear and thereby increasing the life of the brake structure.

Other objects and advantages will become apparent from the following description and the accompanying drawings wherein:

FIG. 2 is a fragmentary sectional view taken generally along line 2—2 in FIG. 1 and partially broken away in order to show certain features in greater detail;

FIG. 3 is a fragmentary perspective view of a novel friction disc constructed in accordance with features of the present invention;

FIG. 4 is an enlarged fragmentary sectional view taken along line 4—4 in FIG. 3; and FIG. 5 is an edge view of the portion of the friction disc shown in FIG. 3.

Figure 1:
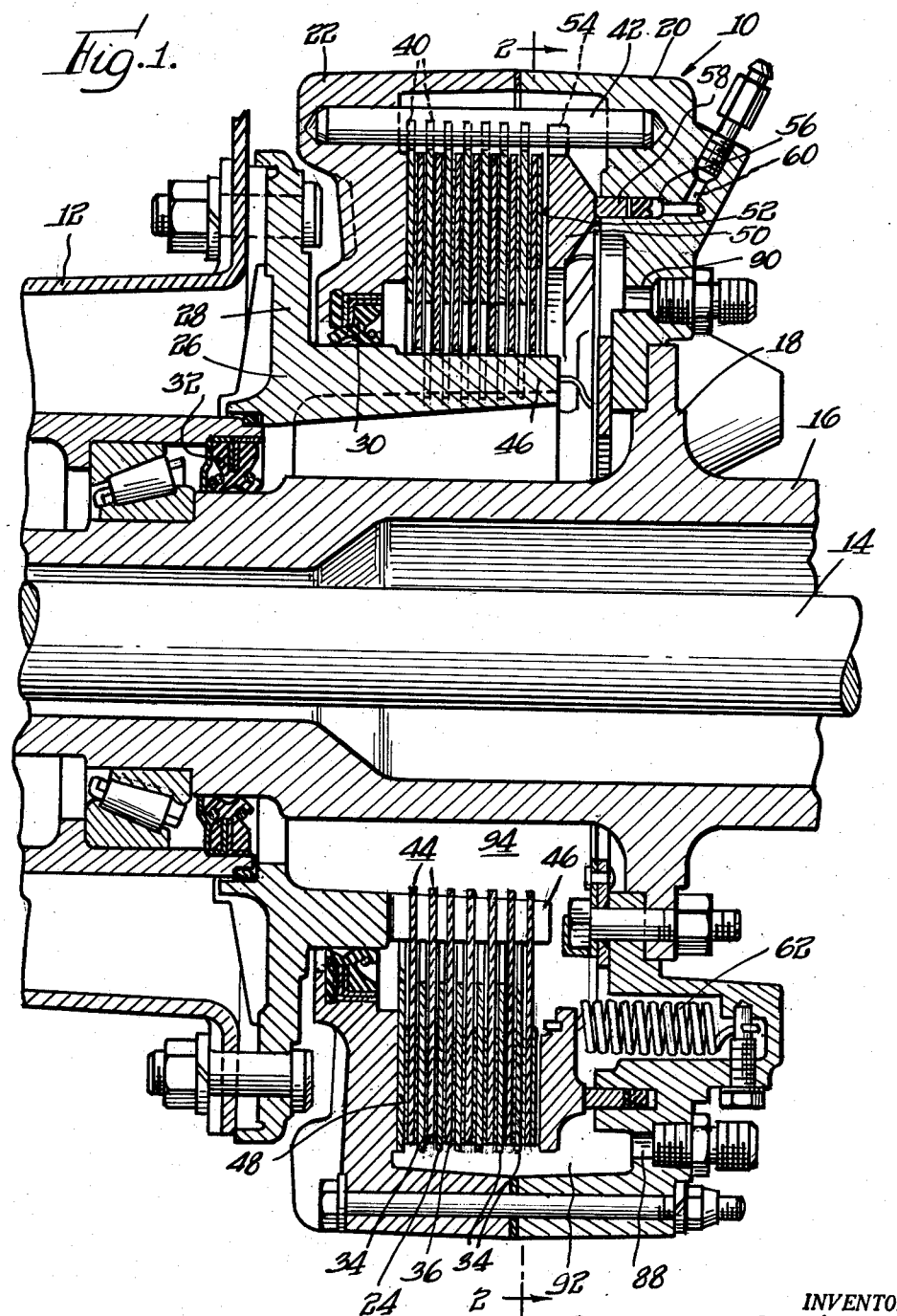
FIG. 1 is a fragmentary partial sectional view showing an assembly including a friction device or brake structure incorporating features of the present invention.

Referring now more specifically to the drawings wherein like parts are designated by the same numerals throughout the various figures, a friction device or brake structure 10 incorporating features of the present invention is shown in FIGS. 1 and 2 in assembled relationship with a rotatable part of wheel 12 to be controlled. While it is to be understood that the brake structure 10 may be assembled in various installations, the rotatable member 12 in the installation shown for the purpose of illustrating one embodiment of the present invention comprises a wheel of a truck or the like which is connected with an outer end (not shown) of a rotatable shaft or axle 14. A fixed tubular housing 16 surrounds the axle 14 and includes a radially extending mounting flange 18 to which a housing member 20 of the brake structure 10 is secured and sealed.

The brake structure 10 includes another housing member 22 which is complementary to the housing member 20 and is secured thereto by means of a plurality of bolts 24. The annular housing member 22 surrounds a rotor or driver member 26 having a radially extending flange 28 bolted or otherwise fixed to the rotatable part or wheel 12 to be controlled. A suitable annular oil seal 30 is provided between the fixed housing member 22 and the rotatable driver member 26. A similar oil seal 32 is provided between the wheel 12 and the fixed axle housing 16 as shown in FIG. 1. Reference is hereby made to a co-pending application Serial No. 840,485, filed September 16, 1959, now abandoned, for additional details of the system and structure with which the brake unit 10 may be installed in accordance with one embodiment of the present invention. Reference is also made to said application for a disclosure of additional features and details of the brake unit 10 which need not be repeated in the present application.

The housing members 20 and 22 define a chamber in which stator friction discs 34 and rotor friction discs 36 are stacked in alternate relationship. As shown in FIGS. 1 and 2 the stator discs 34 are respectively provided with pairs of radially projecting ears 38 and 40 spaced around the periphery thereof. The pairs of ears 38 and 40 of each stator disc are adapted to embrace and engage a fixed stop or abutment elements which in the embodiment shown comprise pins 42 extending between and fixed with respect to the housing members 20 and 22. Thus, the discs 34 are fixed against rotation with respect to the stator portion of the brake unit which comprises the fixed housing members 20 and 22.

The rotor friction discs 36 are carried by the rotor or drive member 26 and are adapted to rotate therewith and relative to the stator friction discs 34. In order to interconnect the rotor member 26 and the rotor discs, inner margins of the rotor discs are provided with splines 44 projecting between axially extending splines 46 of the rotor member 26.

With the structure described above, the discs 34 are fixed against rotation while the discs 36 are rotatable with the drive member or rotor 26 and at the same time the discs 34 and 36 are axially shiftable relative to each other and to the housing and the rotor 26 so as to energize and release the brake structure. In order to actuate the brake structure, means is provided for pressing the friction discs 34 and 36 together and against an annular friction surface 48 provided on an end wall of the housing member 22. This means comprises an annular actuating disc 50 having a friction surface 52 engageable with an endmost friction disc. The actuating disc is provided with pairs of ears 54 which engage the stop pins 42 for preventing rotation of the actuating disc while permitting axial movement thereof.

An annular fluid cylinder 56 is formed in an end wall of the housing member 20 in axial alignment with the actuating disc 50. An annular piston 58 is slidably disposed in the annular fluid chamber or cylinder 56 and is adapted to be actuated by the fluid under pressure.

As shown in FIG. 1, the annular piston 58 abuts the actuating disc 50 so that when the piston is actuated by fluid under pressure the actuating disc will be advanced for energizing the brake structure. Fluid under pressure is supplied to the annular chamber 56 through an inlet passageway 60 from a suitable source of supply and under the control of suitable valve means, not shown. One or more springs 62 are connected between the actuating disc 50 and the end wall of the housing member 20 for returning the actuating disc to a deenergized position when the fluid pressure is released.

As will be understood, a great amount of heat will be created during a braking operation as a result of the frictional engagement between the rotor discs 36 and the stator friction discs 34 and the friction surface of the actuating disc 50. In accordance with an important feature of the present invention, the brake structure is formed so as to enable cooling liquid to be circulated therethrough in a manner which promotes proper and uniform cooling of the various discs and more efficient and effective braking action.

The stator friction discs 34 are formed from a suitable material and are provided with flat annular friction surfaces on opposite sides thereof. As shown in FIG. 2, each stator disc 34 is formed with a plurality of radially disposed slots 64, which slots extend radially inwardly from the peripheral edge of each disc and are substantially equally spaced around the disc. In addition, each disc 34 is provided with radial slots 66 which extend outwardly from an inner margin of each disc and are substantially uniformly spaced around the inner margin and located between the outer slots 64. It is to be noted that the slots 64 have a radial extent substantially in excess of one-half the radial width of the discs 34 and the slots 66 are formed with a similar radial extent for promoting proper flow of cooling liquid in the manner described in detail below.

As shown in FIGS. 2–5, each of the rotor friction discs 36 comprises a central annular body member or disc 68 having annular bands or discs 70 and 72 of a desired friction material bonded or otherwise secured to opposite sides thereof. Each of the rotor discs is formed with a plurality of radially disposed slots 74 through the central bodies and the friction bands thereof and extending inwardly from an outer margin thereof for accommodating fluid flow and for relieving stresses. As shown in FIG. 2, the slots 74 are spaced generally uniformly around the friction discs so that they may periodically become aligned with the radial slots 64 in the stator discs during relative rotation of the rotor and stator discs. Furthermore, it is to be noted that the length of the slots 74 substantially coincides with the length of slots 64 and this length is similar to but slightly less than the radial width of the friction bands 70 and 72. Thus, radially narrow portions 76 of the friction bands at the inner ends of the slots 74 are engageable with the flat friction surfaces of the stator discs for providing means blocking flow of cooling liquid flowing into the slots 64 and 74 in the manner described below.

In order to promote the flow of cooling liquid in and generally uniformly around the stack or pack of rotor and stator discs, the bands of friction lining material 70 and 72 of each of the rotor discs are provided with a plurality of grooves 78 forming lands 80 therebetween. The grooves 78 are concentric with respect to each other but are eccentrically disposed with respect to the axis B of the friction discs. Reference is made to FIG. 2 wherein the manner in which the axis A of the grooves 78 is eccentrically disposed with respect to the axis B is shown. As shown best in FIG. 4, the grooves 78 are formed with a depth which is substantially less than the thickness of the bands of friction lining material.

Each of the bands of friction lining material is further provided with sets of grooves 82, 84 and 86 spaced generally uniformly thereon. As shown in FIGS. 2 and 3, each of the grooves 82 is disposed substantially tangentially to one of the lands 80 which is located toward but spaced from the innermost margin of its associated band of friction lining material so that each groove 82 intersects substantially all of the grooves 78 and lands 80 but does not provide a direct fluid flow path between the inner and outer margins of the associated band of friction lining material. The grooves 84 and 86 are disposed generally perpendicularly to their associated groove 82 and preferably are located so as to traverse the groove 82 adjacent to but spaced from opposite ends thereof. As shown in FIG. 2 certain of the sets of grooves 82, 84 and 86 are disposed so that the groove 82 thereof intersects outer end portions of a pair of adjacent slots 74 in the rotor friction discs and other of the sets of grooves 82, 84 and 86 are disposed so that the grooves 82 thereof intersect an inner end portion of certain of the slots 74. The arrangement of the grooves 82, 84 and 86 further aids in promoting circulation of the cooling liquid in a manner which promotes proper cooling of the brake structure.

As a result of the eccentric arrangement of the grooves 78 with respect to the axis B of the friction discs, an eccentric radial wiping action of the stator friction discs by the lands 80 takes place when the rotor friction discs 36 rotate relative to and are frictionally engaged against the stator friction discs 34. Upon rotation of the rotor friction discs, each land 80 eccentrically revolves around the axis B and creates a radial wipe path, the width of which is equal to twice the eccentric offset of the two axes A and B, plus the radial width of the land doing the wiping. By way of example only, in one specific embodiment of the rotor disc structure, the annular bands of friction lining material may be provided with an 11¾ inch I.D. and a 14¾ inch O.D. Furthermore, the eccentric axis A may be offset from the axis B .132 inch and the lands 80 may be provided with a radial width of .044 inch. Thus, using these dimensions, it can readily be determined that the radial wipe path for any given land 80 will be equal to twice the .132 inch offset of the axes A and B plus the .044 inch radial width of the land, which equals a total of .308 inch. In the specific embodiment, the lands are provided with a pitch of .066 inch and upon dividing the above mentioned .308 inch by this pitch a figure of 4.666 results which indicates that the contiguous stator disc friction area is swept 4⅔ times outwardly and inwardly per each disc revolution. It is further readily apparent that the sweep path of each land 80 overlaps the sweep path of the land next to it and, each land may overlap the sweep paths of several adjacent lands, depending upon the amount of eccentricity between the A and B axes.

As has been previously indicated herein, a suitable cooling liquid is circulated through the brake structure. The aforementioned co-pending application discloses a suitable system for providing such cooling liquid, and this system is connected with an inlet port 88 and an outlet port 90 formed in an end wall of the housing member 20 as shown in FIGS. 1 and 2. The cooling liquid which enters through the port 88 flows into an annular space 92 within the brake structure housing and defined by the periphery of the housing and the outer margins of the friction and actuating discs. The cooling fluid or liquid is supplied under pressure and a portion thereof readily flows into the pack of friction discs by entering the slots 64 and 74. Since all of these slots terminate short of the inner margin of the annular bands of friction lining material, the cooling liquid tends to flow from the slots 64 and 74 into the grooves 78 between the lands. Additional portions of the cooling fluid enter the grooves 82, 84 and 86 and flow between these grooves and the grooves 78. Some of the cooling liquid then flows through the inner end portions of the slots 84 and 86 and into a space 94 within the pack of annular discs. Additional amounts of the cooling fluid flow through the slots 66 and into the space 94. It will be noted that as the rotor friction discs rotate relative to the stator discs the slots 66 will, in effect, sweep across the innermost grooves 78 and ends of the grooves 84 and 86 and also midportions of the grooves 82 for promoting flow of cooling fluid from the portions of the grooves and into the space 94.

From the above description it is apparent that the various passageways and grooves define passageway means for the liquid coolant which facilitates rapid flow of a desired volume of the coolant from the annular space 92 and into the disc pack or in other words between the friction discs. The passageway means is further such that the flow of the coolant directly through the disc pack and into the central space 94 is retarded and the coolant is divided up into numerous portions which are spread entirely around the surfaces of the friction discs in a manner which enables the coolant to contact all areas of the friction disc surfaces so as to promote uniform cooling and the elimination of hot spots. The passageway means provided by the grooves and slots is still further formed so that the liquid coolant which has entered the various grooves and served its desired function will be substantially completely flushed from the grooves and into the space 94 before any substantial overheating and burning or carbonizing of the coolant can take place. Of course, the coolant entering the central chamber 94 flows out through the port 90 and is recycled through the coolant supply system such as that disclosed in the aforementioned co-pending application.

The cooling liquid inherently tends to act as a lubricant between the rotor and stator friction discs and the eccentric arrangement of the lands 80 which provides the above described wiping action insures that the entire friction surface of the discs will be wiped frequently during each revolution of the rotor discs for promoting an effective braking action. Furthermore, as a result of the eccentric motion of the lands with respect to the stator discs, any scarring resulting from the wiping action is minimized. Another advantage of the eccentric arrangement of the lands 80 is in that they may be produced more economically than other types of lands which, for example, may be arranged in a spiral pattern.

While the preferred embodiment of the present invention has been shown and described herein, it is obvious that many structural details may be changed without departing from the spirit and scope of the appended claims.

The invention is claimed as follows:

1. A friction device of the type described comprising housing means through which a cooling fluid may be circulated, a friction disc pack including a plurality of axially aligned and shiftable rotor and stator friction discs supported within said housing means and stacked in alternate relationship as rotor and stator groups of discs, and means for urging said friction discs together for energizing the friction device, said housing means defining a space around said friction discs and a space within said friction discs adapted to be filled with cooling fluid, and said friction discs including means providing a plurality of fluid passageway means facilitating easy flow of cooling fluid from one of said spaces into said friction disc pack and then restricting the flow of cooling fluid and spreading the fluid throughout the pack and then directing the fluid to the other of said spaces, said means providing said fluid passageway means including a plurality of radially spaced annular lands on one group of said discs defining annular grooves therebetween, said lands being substantially concentric with respect to each other and eccentric with respect to said discs, a plurality of circumferentially spaced chordally disposed groove means in the discs of said one group completely intersecting their radially outermost lands and approaching but not completely intersecting their radially innermost lands, and a plurality of generally radially disposed circumferentially spaced slots through the discs of said one group and extending from their outer peripheries toward and terminating short of their innermost lands.

2. A friction device, as defined in claim 1, wherein said means providing said fluid passageway means includes additional groove means in the discs of said one group and traversing opposite end portions of the chordally arranged groove means and extending between and intersecting said radially outermost and innermost lands.

3. A friction device, as defined in claim 2, wherein said means providing said fluid passageway means includes additional generally radially disposed slots in the other group of said discs alternately arranged with the discs of said one group, certain of said last mentioned slots extending inwardly from outer peripheries of the discs of said other group and others extending outwardly from inner margins of the discs of said other group.

References Cited in the file of this patent

UNITED STATES PATENTS

| 1,860,375 | Winterer et al. | May 31, 1932 |
| 2,971,612 | Graber | Feb. 14, 1961 |